(12) United States Patent
Daley et al.

(10) Patent No.: US 10,167,917 B2
(45) Date of Patent: Jan. 1, 2019

(54) VIBRATION CONTROL

(71) Applicant: BAE SYSTEMS plc, London (GB)

(72) Inventors: Stephen Daley, Southampton (GB); Stephen John Elliott, Southampton (GB); Emiliano Rustighi, Southampton (GB); Michelle Zilletti, Southampton (GB)

(73) Assignee: BAE Systems PLC, London (GB)

( * ) Notice: Subject to any disclaimer, the term of this patent is extended or adjusted under 35 U.S.C. 154(b) by 0 days.

(21) Appl. No.: 15/883,549

(22) Filed: Jan. 30, 2018

(65) Prior Publication Data
US 2018/0156292 A1    Jun. 7, 2018

Related U.S. Application Data

(63) Continuation of application No. 14/903,798, filed as application No. PCT/GB2014/052002 on Jul. 2, 2014, now Pat. No. 9,915,312.

(30) Foreign Application Priority Data

Jul. 12, 2013   (EP) ..................................... 13275162
Jul. 12, 2013   (GB) ................................... 1312497.9

(51) Int. Cl.
*F16F 15/00*    (2006.01)
*F16F 7/10*    (2006.01)
(Continued)

(52) U.S. Cl.
CPC .......... *F16F 7/1005* (2013.01); *F16F 7/1011* (2013.01); *F16F 15/005* (2013.01); *F16F 15/02* (2013.01); *F16F 15/03* (2013.01)

(58) Field of Classification Search
CPC ........ F16F 15/03; F16F 7/1011; F16F 15/002; F16F 7/1005; B60G 2202/25; G10K 2210/1291
See application file for complete search history.

(56) References Cited

U.S. PATENT DOCUMENTS 1,819,665 A    8/1931   Wiltse
4,282,938 A    8/1981   Minamidate
(Continued)

FOREIGN PATENT DOCUMENTS

CN    202381623 U    8/2012
DE    102007015634 A1    10/2008
(Continued)

OTHER PUBLICATIONS

International Search Report and Written Opinion received for Patent Application No. PCT/GB2014/052002, dated Aug. 29, 2014, 13 pages.
(Continued)

*Primary Examiner* — Bradley Duckworth
(74) *Attorney, Agent, or Firm* — Finch & Maloney PLLC

(57) ABSTRACT

A machine is on a first side of a plate. A cable, a bundle of cables, a pipe carrying a fluid to or from the machine, a conduit, or any combination of these, passes along or through the plate. The plate is susceptible to vibrations arising from operation of the machine. An active vibration suppressor is mounted on the cable(s), pipe, or conduit, and a controller is configured to control the active vibration suppressor to suppress vibrations of the plate.

18 Claims, 8 Drawing Sheets

(51) Int. Cl.
*F16F 15/02* (2006.01)
*F16F 15/03* (2006.01)

(56) References Cited

U.S. PATENT DOCUMENTS

| | | | |
|---|---|---|---|
| 4,394,985 | A | 7/1983 | Graf et al. |
| 4,710,656 | A | 12/1987 | Studer |
| 5,251,863 | A | 10/1993 | Gossman et al. |
| 5,845,236 | A | 12/1998 | Jolly et al. |
| 5,883,447 | A | 3/1999 | Clausin |
| 6,389,941 | B1 | 5/2002 | Michler |
| 8,044,629 | B2 | 10/2011 | Fallahi |
| 8,061,677 | B2 | 11/2011 | Johnson et al. |
| 9,915,312 | B2 * | 3/2018 | Daley ................. F16F 15/005 |
| 2009/0023571 | A1 | 1/2009 | Kusumoto et al. |
| 2010/0019425 | A1 | 1/2010 | Iemura et al. |
| 2013/0061743 | A1 | 3/2013 | Lee et al. |
| 2013/0166077 | A1 | 6/2013 | Elliott et al. |
| 2014/0117801 | A1 | 5/2014 | Permuy |

FOREIGN PATENT DOCUMENTS

| | | |
|---|---|---|
| EP | 0552695 A1 | 7/1993 |
| EP | 2620670 A1 | 7/2013 |
| JP | S5950243 A | 3/1984 |
| JP | H04281870 A | 10/1992 |
| JP | H0518437 A | 1/1993 |
| JP | H0526291 A | 2/1993 |
| JP | H05172183 A | 7/1993 |
| JP | H07113438 A | 5/1995 |
| JP | 2003278830 A | 10/2003 |
| JP | 2008265379 A | 11/2008 |
| JP | 2009091859 A | 4/2009 |
| KR | 100583075 B1 | 5/2006 |
| WO | 2015004425 A1 | 1/2015 |

OTHER PUBLICATIONS

GB Intellectual Property Office Search Report under Section 17(5) received for GB Patent Application No. 1312497.9 dated Jan. 10, 2014, 3 pages.

Extended European Search Report received for EP Patent Application No. 13275162.9 dated Jan. 3, 2014, 9 pages.

International Preliminary Report on Patentability received for Patent Application No. PCT/GB2014/052002, dated Jan. 21, 2016, 8 pages.

* cited by examiner

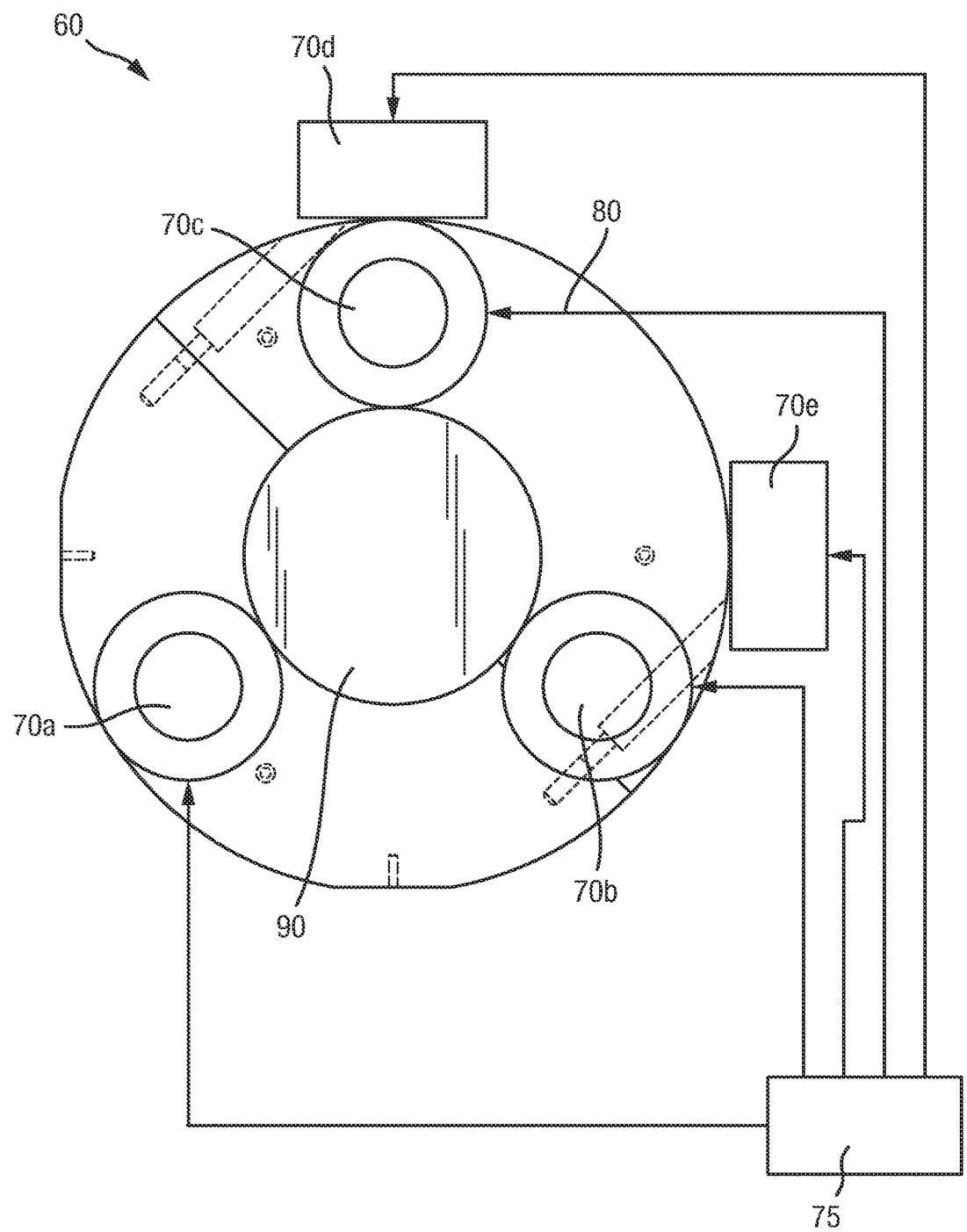

VIBRATION CONTROL

RELATED APPLICATIONS

This application is a continuation of U.S. National Phase application Ser. No. 14/903,798, filed Jan. 8, 2016 titled "IMPROVEMENTS IN AND RELATING TO VIBRATION CONTROL", which claims priority to PCT/GB2014/052002, filed Jul. 2, 2014, that in turn claims priority to EP 13275162.9 filed Jul. 12, 2013 and GB1312497.9 filed Jul. 12, 2013, the content of each of which is hereby incorporated by reference in its entirety.

FIELD OF THE INVENTION

This invention relates to the field of vibration control. More particularly, the invention relates to active suppression of vibrations caused by machinery. Still more particularly, but not exclusively, the invention relates to active suppression of vibrations in vehicles, for example nautical vessels.

BACKGROUND

Machinery typically vibrates as it operates. The vibration can cause problems, for example mechanical damage, reduced efficiency of operation, increased noise and discomfort for persons in the vicinity of the machine. For example, in a nautical vehicle such as a ship, excessive vibration from the ship's engines can make travel in the ship uncomfortable.

It is known to use active machinery raft isolation mounts to control vibrations resulting from the operation of machinery. However, machinery is typically coupled to its environment in ways additional to the coupling through the machinery's mounting, for example by flexible couplings associated with exhaust, cooling, fuel and power supply systems. Such couplings and other connections provide additional paths for vibrations to propagate from the machinery, even if no vibrations were coupled across the mounts.

Wölfel Beratende Ingenieure GmbH+Co. KG produces an active absorber (ADD.Pipe) for the reduction of vibrations in pipes in piping systems in chemical plants and power plants. Vibrations in such systems are typically caused by water or other liquid hammers, pressure pulses or other excitations. The ADD.Pipe system is a collar that is clamped onto the piping system and includes a sensor that measures vibrations in the pipe and linear actuators actively controlled to move reaction masses to damp the vibrations in the pipe. However, the system offers only limited control, and has the potential to suffer from an effect known as pinning, in which vibration at the point of attachment of the collar is reduced but becomes worse at points elsewhere in the pipeline.

It would be advantageous to provide an apparatus, including an active vibration suppressor, in which one or more of the aforementioned disadvantages is eliminated or at least reduced.

SUMMARY

A first aspect of the invention provides an apparatus including a machine, a rod and a plate, wherein the machine is on a first side of the plate and at least part of the rod is on the second, opposite, side of the plate, and wherein the plate is susceptible to vibrations arising from operation of the machine, the apparatus further including an active vibration suppressor mounted on the rod, and a controller configured to control the active vibration suppressor to reduce vibrations of the plate.

It may be that the rod passes through the plate, from the first side of the plate to the second side of the plate.

It may be that the vibrations of the plate are minimised.

It may be that the machine is a source of motive force, for example an engine, for example an internal combustion engine, an electric motor or a turbine.

It may be that the rod is connected, for example directly connected, to the machine. It may be that the rod is driven by the machine. It may be that the rod is also susceptible to vibrations arising from operation of the machine.

It may be that the rod is a pipe. It may be that the rod is a cable or a bundle of cables. It may be that the rod is connected to or associated with the machine, for example it may be a pipe carrying a fluid to or from the machine (for example, fuel, coolant or exhaust) or a conduit carrying for example electrical power couplings.

It may be that the rod is flexible. Alternatively, it may be that the rod is rigid.

It may be that the plate is a flat plate. It may be that the plate is a curved plate.

It may be that the plate is a shell or a wall or a bulkhead.

It may be that the plate is or is part of a housing containing the machine. The housing may, for example, be a cuboidal housing, or a dome-shaped housing, or have another or a more complex shape. It may be that the plate forms part of a wall of the housing: the first side of the plate will then be inside the housing and the second side of the plate will be outside the housing.

It may be that the plate is part of the machine itself, or is directly connected to the machine.

It may be that the rod or at least part of the rod is perpendicular to the plate.

It may be that the rod or at least part of the rod is parallel to the plate.

It may be that the rod is rigidly connected to the plate.

It may be that the rod is resiliently connected to the plate.

It may be that the rod is formed from a first part on the first side of the plate and a second part on the second side of the plate, such that the first and second parts meet at the plate and are connected to each other and/or to the plate.

It may be that the active vibration suppressor is mounted on the rod on the second side of the plate, i.e. the opposite side from the machine.

It may be that the active vibration suppressor includes a collar that is connected to and at least partially surrounds the circumference of the rod. It may be that the collar completely surrounds the circumference of the rod. It may be that the collar is integrated with the rod (i.e. they are monolithic). It may be that the collar is permanently fixed to the rod. It may be that the collar is releasably fixed to the rod. It may be that the collar is moveable on the rod. It may be that the collar is positioned immediately adjacent to the plate.

It may be that the active vibration suppressor comprises a plurality of (for example 5) actuators arranged to act on the rod. It may be that the actuators act on the rod directly or it may be that the actuators act on the rod indirectly, for example through the collar, if present. It may be that at least one of the actuators is arranged to act in a direction parallel to the length of the rod. It may be that there are three actuators, arranged to act on the rod in three orthogonal directions. It may be that two or more of the plurality of the actuators are arranged to act on the rod the same direction, for example in a direction parallel to the length of the rod.

For example, there may be three or more actuators arranged to act in a direction parallel to the length of the rod by acting on a first surface of a collar connected to and at least partially surrounding the rod, the first surface being perpendicular to the rod, and there may be two or more further actuators arranged to act in two directions orthogonal to the length of the rod and each other by acting on the collar on a surface perpendicular to the first surface. It may be that the plurality of actuators includes one or more actuators arranged to apply a bending moment to the rod. It may be that the plurality of actuators includes two or more actuators arranged to apply orthogonal bending moments to the rod. It may be that the plurality of actuators includes one or more actuators arranged to apply radial forces to induce compression in the rod; advantageously, the rod may be a pipe arranged to carry a flow and the controller may be configured to control that one or more actuator to suppress flow noise in the pipe.

The actuators may be magnetostrictive actuators. The actuators may be voice-coil activators. The actuators may be piezo-electric devices.

The apparatus may further comprises a plurality of sensors arranged to sense vibrations of the plate and to generate a signal indicative of those vibrations. The sensors may for example measure the velocity of the plate at the location of the sensor. The controller may be configured to receive the generated signal and to use it to determine a control signal to be generated and applied to the actuators to suppress vibrations of the plate. The controller may be configured to suppress vibrations of the plate by minimising a parameter derived from the signal from the sensors, for example minimising the sum of mean squared velocities measured by the sensors. The controller may be configured to control three degrees of freedom of movement of the plate, for example movement in three orthogonal directions, two in the plane of the plate and the third perpendicular to the plate, or one perpendicular to the plate and moments about two perpendicular axes in the plane of the plate. The controller may be configured to control five degrees of freedom of movement of the plate, for example movement in three orthogonal directions, two in the plane of the plate and the third perpendicular to the plate, and moments about two perpendicular axes in the plane of the plate. It may be that there is the same number of actuators as there are degrees of freedom of movement controlled by the controller.

It may be that the controller is configured to control the active vibration suppressor also to reduce vibrations of a further part of the apparatus, for example a part of the rod or another rod included in the apparatus. The apparatus may then further comprise a plurality of sensors arranged to sense vibrations of the further part of the apparatus and to generate a signal indicative of those vibrations. The sensors may for example measure the velocity of the further part at the location of the sensor. The controller may be configured to receive the generated signal and to use it to determine a control signal to be generated and applied to the actuators to suppress vibrations of the further part. The controller may be configured to suppress vibrations of the further part by minimising a parameter derived from the signal from the sensors, for example minimising the sum of mean squared velocities measured by the sensors. The controller may be configured to control three degrees of freedom of movement of the further part, for example movement in three orthogonal directions. The controller may be configured to control five degrees of freedom of movement of the further part, for example movement in three orthogonal directions and moments about two perpendicular axes. It may be that there is the same number of actuators as there are degrees of freedom of movement controlled by the controller.

A second aspect of the invention provides a method of suppressing vibrations arising from operation of a machine, wherein the machine is part of an apparatus also including a rod and a plate, the machine being on a first side of the plate and at least part of the rod being on the second, opposite, side of the plate, the plate being susceptible to vibrations arising from operation of the machine, the method comprising applying an actively controlled force to the rod to reduce vibrations of the plate.

A third aspect of the invention provides vibration suppression equipment suitable for use in reducing vibrations in an apparatus comprising a machine, a rod and a plate, the equipment comprising:
 (i) an active vibration suppressor, adapted to be mounted on the rod; and
 (ii) a controller configured to control the active vibration suppressor to reduce vibrations of the plate.

It will of course be appreciated that features described in relation to one aspect of the present invention may be incorporated into other aspects of the present invention. For example, the method of the invention may incorporate any of the features described with reference to the apparatus of the invention and vice versa.

BRIEF DESCRIPTION OF THE DRAWINGS

Example embodiments of the invention will now be described by way of example only and with reference to the accompanying drawings, of which:

FIG. 2 is a front elevation of a collar from the apparatus of FIG. 1A;

DETAILED DESCRIPTION

Figure 1A:
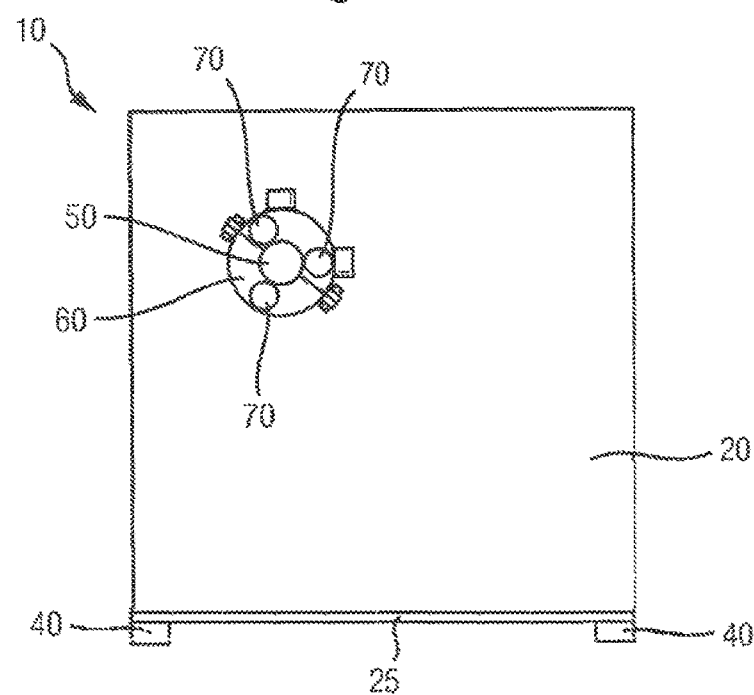
FIG. 1A is an apparatus that is an example embodiment of the invention, shown in front elevation.
Figure 1B:
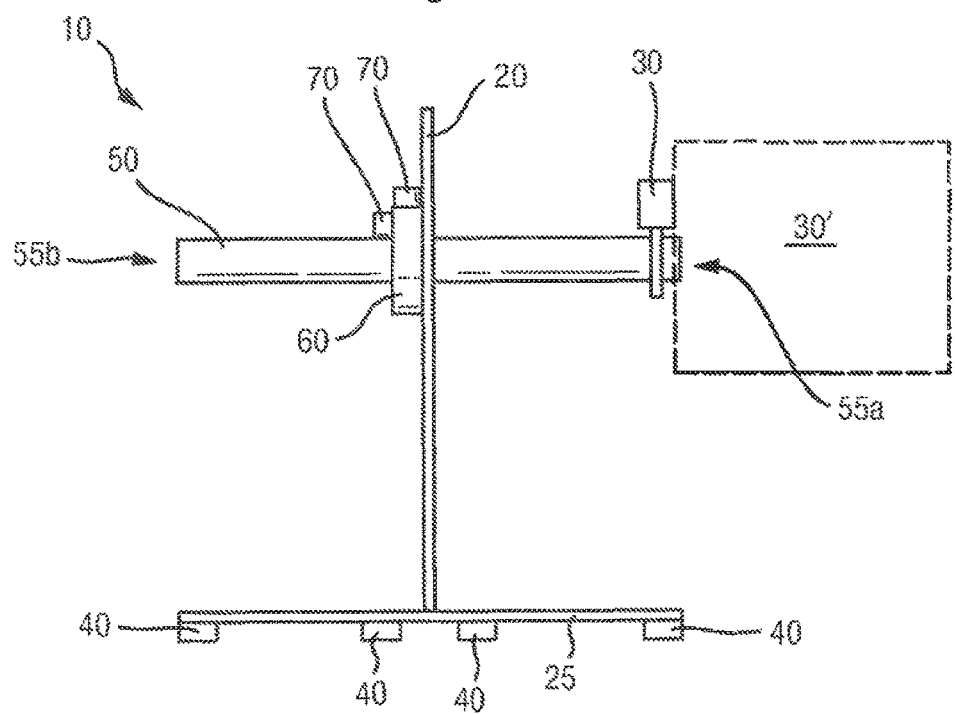
FIG. 1B is the apparatus of FIG. 1A, shown in side elevation.

An example embodiment of the invention was created as an experimental test apparatus 10 (FIGS. 1A and 1B). The test apparatus 10 includes a cantilever plate 20 supported on a base sheet 25. The base sheet 25 is mounted on a plurality of isolation mounts 40, which act to isolate the plate 20 from environmental vibrations, to improve the accuracy of the testing. The cantilever plate 20 is coupled with a pipe 50 having its axis perpendicular to the plate 20. The pipe 50 is free at both of its ends 55a, 55b. The pipe 50 passes through a hole in the plate 20, the hole being off-centre, offset towards the top and side of the plate 20.

An active vibration suppressor including a moveable collar 60 is mounted on the pipe 50, on the side of the plate 20 towards the left-hand end 55b of the pipe 50, as shown in FIG. 1B. In this experiment, the collar 60 was mounted so that it abutted the plate 20. The collar 60 carried a plurality of actuators 70.

Vibrations were excited in the plate 20 and pipe 50 using a primary actuator (shaker) 30, mounted on the pipe 50, on the opposite side of the plate 20, close to the opposite end 55a of the pipe 50. This shaker 30 was used to excite vibrations representing the vibrations that would be excited by a machine 30' connected to the end 55a of the pipe 50.

The collar 60 and actuators 70 are shown in more detail in FIG. 2. The collar 60 is a steel annulus 80, approximately 20 cm in diameter with a central circular hole 9 cm in diameter. The annulus 80 is of rectangular cross-section, having flat front and rear surfaces and flat inner and outer walls. Five actuators 70a-e are mounted on the annulus 80: three are mounted on the front surface and two on the outer wall. The three actuators 70a-c mounted on the front surface of the annulus 80 are spaced equidistantly around the annulus, i.e. separated by 120 degrees. These three actuators 70a-c act in a direction perpendicular to the plane of the annulus 80, i.e. parallel to the axis of the pipe 50 when the collar is in use. The other two actuators 70d, e, mounted on the outer wall of the annulus, act in directions perpendicular to the plane of the annulus 80 and perpendicular to each other. Thus the three actuators 70a-c on the front surface, on the one hand, and the two actuators 70d, e on the outer wall on the other hand together provide actuation in three orthogonal directions.

A computer model of a beam was used to represent the plate 20 and pipe 30, with the beam having the same length and second moment of area as the pipe 30. The geometrical and physical parameters of the system are summarised in Table 1.

TABLE 1

| Parameter | Value |
|---|---|
| PIPE | |
| Diameter of the pipe cross section | D = 89.9 × 10 − 3 m |
| Thickness of the pipe | s = 5 × 10 − 3 m |
| Length of the pipe | l = 1 m |
| Mass of the pipe | Mpipe = 5.3 Kg |
| PLATE | |
| Plate's edges | (lx, ly) = (1, 1) m |
| Thickness | h = 20 × 10 − 3 m |
| Intersection between the plate and beam | (bx,by) = (375 × 10 − 3, 1.125 × 10 − 3) mm |
| Mass of the plate | Mp = 155 Kg |
| MATERIAL STEEL | |
| Density | ρ = 7750 Kg/m3 |
| Young Modulus | E = 200*109 N/m2 |
| Poisson's coefficient | ν = 0.33 |

When the model of the system is excited at the end of the beam corresponding to the end 55a of the pipe 50 by three in-phase forces along each of the three main directions, resonances are clearly evident, in both the beam and the plate.

In the simulations, 285 modes of the flexural vibration of the plate and 15 modes of the in-plane vibration of the plate, the flexural vibration of the beam and axial vibration of the beam were included. In order to gain a better understanding of the dynamics of the system the velocities in the z direction at 1156 points scattered on the plate were calculated when the system was excited at frequencies that coincide with the first few resonances of the system.

Simulations were carried out both of the case in which the active vibration suppressor is placed on the plate 20 and the case in which it is place on the pipe 50.

Figure 3:
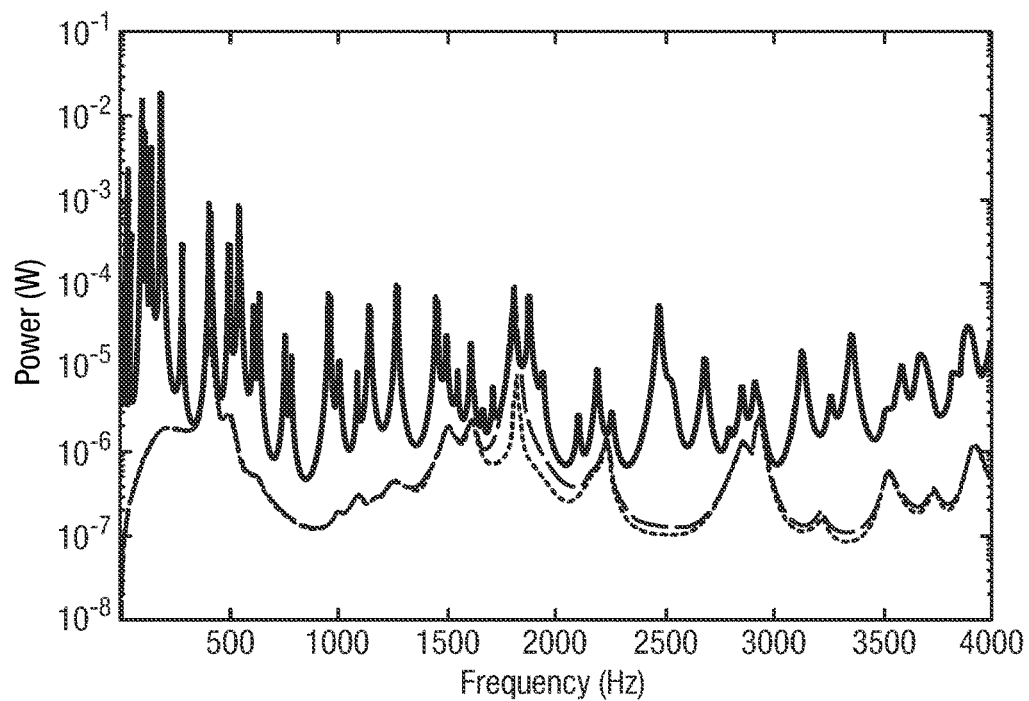
FIG. 3 is a plot, against frequency in Hertz, of power in Watts input into the plate of the apparatus of FIG. 1A in a simulation, without control (solid line), when the power input into the plate is minimised using three vertical (i.e. z-axis, parallel to the beam) control forces (dashed line) and using three vertical control forces and two horizontal (i.e. parallel to the plate) control forces (dotted line), all acting on the plate.

In the first simulation, a feed-forward control strategy was selected to minimise the power input into the plate, using multiple actuators located on the plate, adjacent to and surrounding the beam. Three control forces were provided in the z direction (parallel to the pipe) and two control forces along the x and y directions. FIG. 3 shows the power input into the plate without control (black line), when the controller is optimised to minimise the power input into the plate at each frequency when only three vertical forces are used (dashed line), and when five control forces (three vertical and two horizontal) are used (dotted line). The best reduction of the power input into the plate is obtained at low frequency when the wavelength is much bigger than the distance between the secondary sources and the intersection point between the plate and the beam. The plot shows that the use of two extra control forces in x and y directions allows the system to achieve some control even at the in-plane resonance frequency of 1800 Hz.

For simulation of the arrangement in which the control sources are placed on the pipe 50, the actuators were located in the model on the beam at 3 cm from the plate, on the unexcited side of the beam.

From a practical point of view, measurement of the power input into the plate 20 would be difficult to implement. An alternative and more practical control strategy is to measure the velocities at a number of points on the plate 20 and thus to minimise the sum of the mean squared velocities.

Three different configurations of the control system were simulated. In the first configuration a force acting along the axis of the beam and two forces along the x and y axis are used as secondary sources. In the second configuration a force acting along the axis of the beam and two moments around the x and y axes are used as secondary sources. In the last case three forces and two moments acting on the beam are used as secondary sources.

The model included three error sensors placed on the plate 20, around the pipe 50. The distance between the axis of the pipe 20 and the error sensor was 20 cm. There were also five monitoring sensors positioned on the plate 20, which could measure the velocity along the z-axis only (this constraint was used to represent the experimental facility). The purpose of the monitoring sensors was to obtain an indication of the global response of the plate 20 when control is applied.

Figure 4:
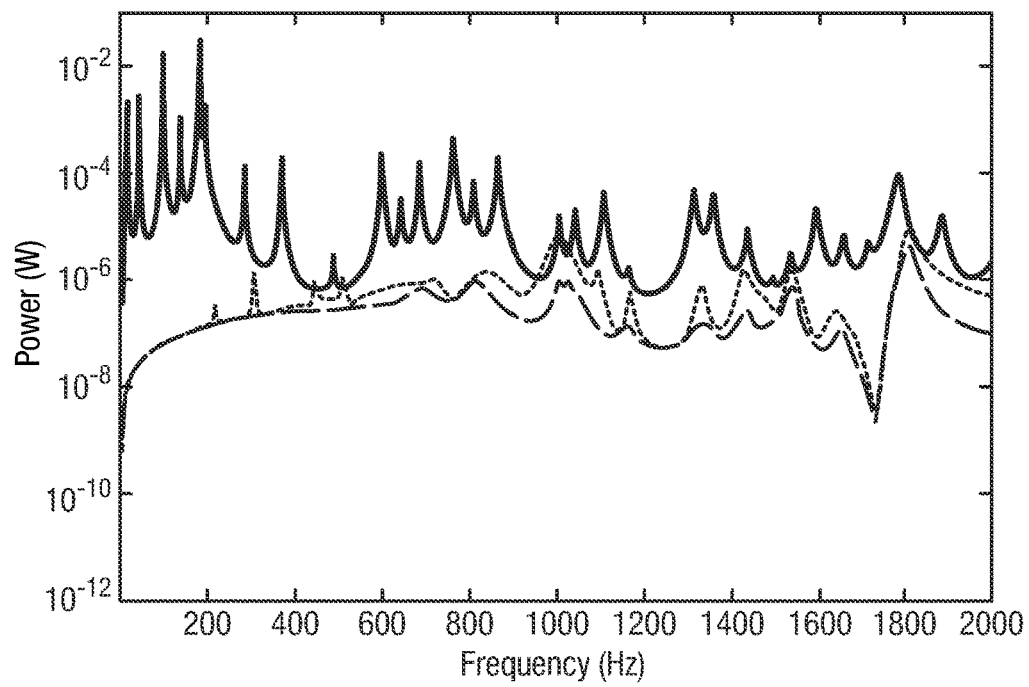
FIG. 4 is a plot, against frequency in Hertz, of power in Watts input into the plate of the apparatus of FIG. 1A in a simulation, without control (solid line) when the power input into the plate (dashed line) is minimised and also when the sum of the velocity squared, measured using three sensors located on the plate, is minimised (dotted line), where the controller consists of three forces acting on the beam at 3 cm from the plate.

For the first configuration, FIG. 4 shows the modelled power input into the plate without control (solid line), when the optimal controller that minimises the power input into the plate is implemented (dashed line) and when the sum of the velocities squared measured by three error sensors is minimised (dotted line). The three error sensors are able to measure the velocity along the three principal axis x, y, and z. FIG. 4 shows that minimising the sum of the mean squared velocities measured by the three error sensors closely corresponds to the minimisation of the power input of the plate at low frequency, although at higher frequency less reduction in the power input into the plate is obtained in this example when the sum of the mean squared velocities is minimised.

Figure 5:
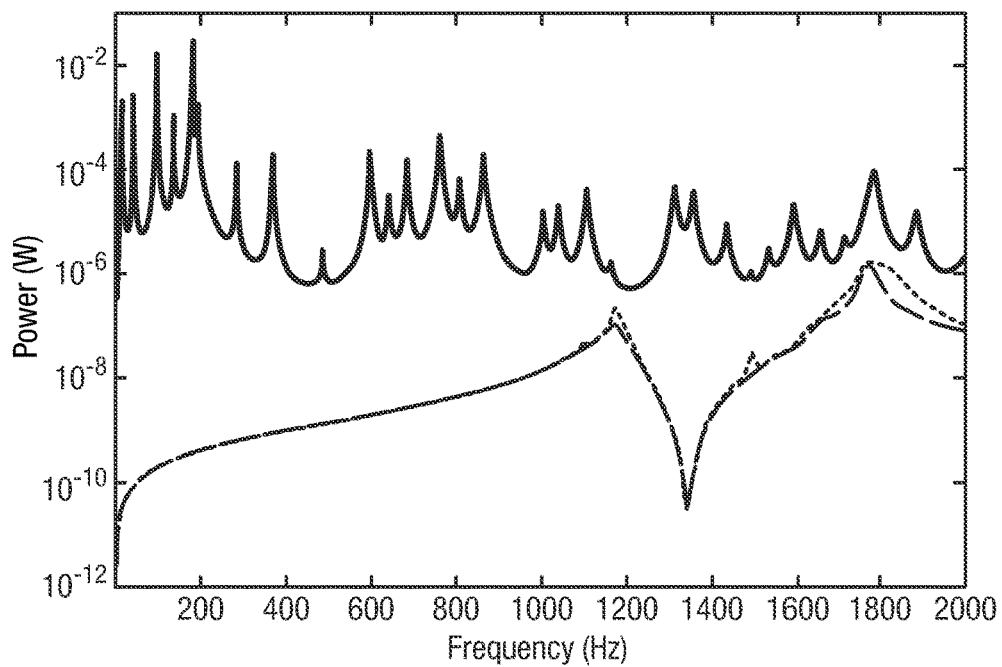
FIG. 5 is a plot, against frequency in Hertz, of power in Watts input into the plate of the apparatus of FIG. 1A in a simulation, without control (solid line) when the power input into the plate (dashed line) is minimised and also when the sum of the velocity squared, measured using three sensors located on the plate, is minimised (dotted line), where the controller consists of a vertical force and two moments acting on the beam at 3 cm from the plate.

The second configuration simulates a vertical force along the z-axis (i.e. along the pipe 50) and two moments around the x- and y-axes acting on the pipe 50. FIG. 5 shows the modelled power input into the plate without control (solid line), when the optimal controller that minimises the power input into the plate is implemented (dashed line) and when the sum of the velocities squared measured by three error sensors is minimised (dotted line). The plot shows that in this case the two control strategies give very similar reduction in the power input into the plate. Moreover, for this case, a vastly superior reduction compared with the previous case of three secondary forces was achieved. The two peaks that appear around 1.2 and 1.8 kHz are due to flexural vibration of the beam.

Figure 6:
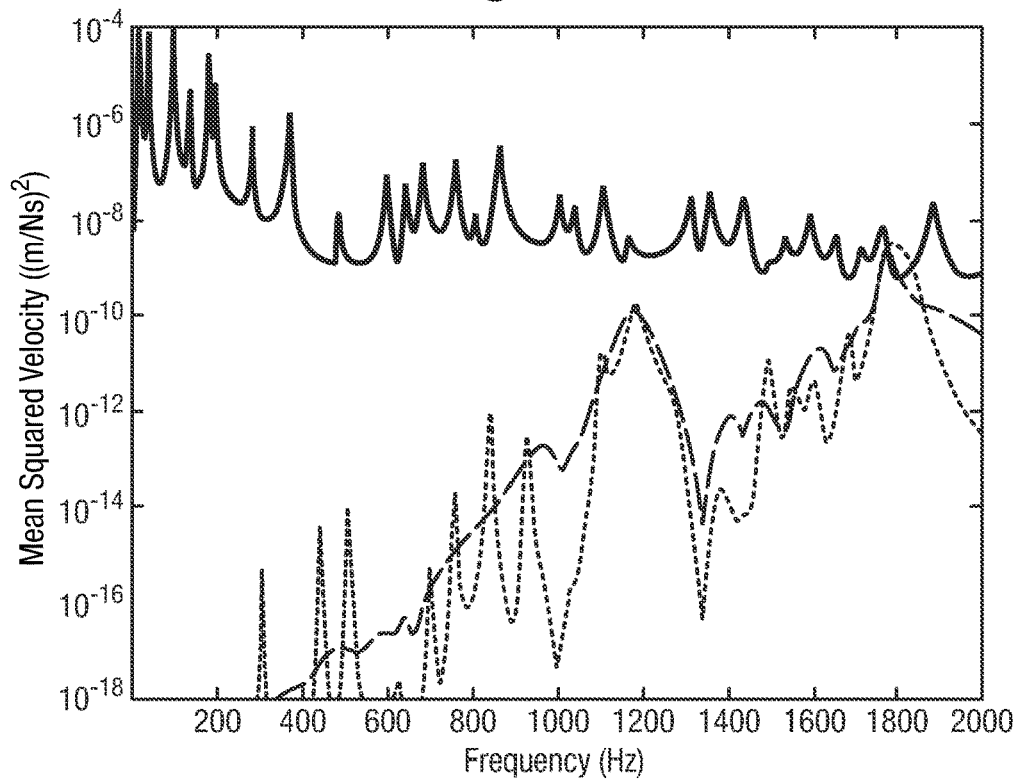
FIG. 6 is a plot, against frequency in Hertz, of the sum of the mean squared value of the velocities along the z-axis measured by five monitoring sensors in a simulation, without control (solid line) when the power input into the plate is minimised (dashed line) and when the sum of the mean squared value of the velocities measured by three error sensors is minimised (dotted-line), for the same conditions as were used to generate FIG. 5.

FIG. 6 shows the sum of the mean squared velocities measured by the five monitoring sensors without control (solid line), when the power input into the plate is minimised (dashed line), and when the mean squared velocity measured by the three errors sensors is minimised (dotted line). The plot shows that excellent overall reduction in the vibration of the plate can be achieved using both control strategies up to about 1.8 kHz.

Further simulation results have shown that in the third configuration (i.e. with three secondary forces acting along the x, y and z axes and two moments around the x- and y-axes) in theory both the power injected into the plate, and the sum of the mean squared velocities are perfectly controlled; they are not reproduced here since the results tend to zero.

We now return to the experimental apparatus 10 of FIGS. 1A and 1B. The five actuators 70*a-e* on the collar 60 are each inertial electromagnetic actuators. As discussed above, actuators 70*a-c* generate a force perpendicular to the plate 20 while actuators 70*d* and 70*e* produce forces along the other two principal directions. The collar 60 can be rotated and moved along the pipe 50; however, in the experimental results presented below the collar 60 is positioned as close as possible to the plate 20. As in the simulations, three accelerometers (not shown) are used as error sensors for control purposes; they are able to measure the acceleration along the three principal axes. Four single axis accelerometers (not shown) were also placed on the plate 20 in order to monitor the global response. The primary disturbance excitation was provided using a Data Physics IV 40 inertial actuator (shaker) 30 located near the tip 55*a* of the pipe 50. That primary shaker 30 is also mounted on a collar which enables a variety of disturbances to be effected, by mounting the shaker 30 in different orientations.

Before attempting real-time control the level of performance achievable with this arrangement was assessed. For this purpose the transfer functions from, on the one hand, the primary source 30 and the actuators 70 to, on the other hand, all the sensors mounted on the plate 20 were measured. Those measured transfer functions were then used in further simulations to predict the behaviour of the system when different harmonic control strategies were implemented. The measured transfer functions were also used for the identification of the system required to implement real time control. All the transfer functions between the primary actuator 30 and secondary actuators 70 and the error and monitor sensors were measured using a twenty channel analyser (Data Physics Mobilyzer II). Although the transfer functions between the primary shaker 30 and the sensors have been measured for 4 different orientations of the primary actuator, only the results when the primary force forms an angle of about 45 degrees with each of the principal axis are presented here.

Figure 7A:
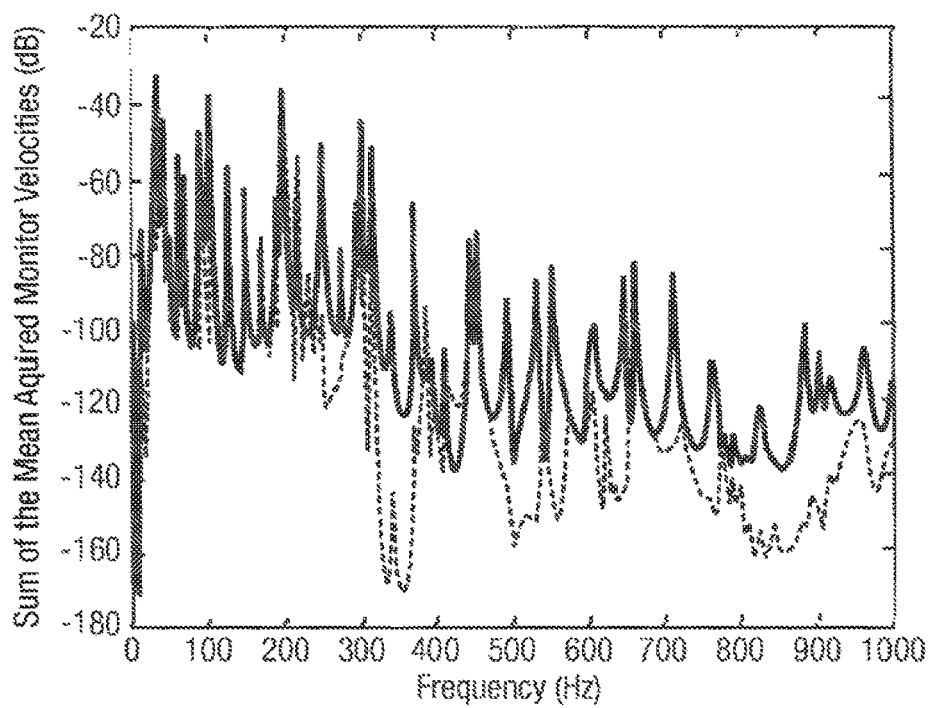
FIG. 7A is a plot, against frequency in Hertz, of the sum of the mean squared value of the velocities in the z-direction measured by the monitor sensors before control (solid line) and after control (dashed line), in a simulation employing transfer functions measured on the apparatus of FIGS. 1A and 2, and in which three actuators apply a common vertical force and two further actuators apply horizontal forces.
Figure 7B:
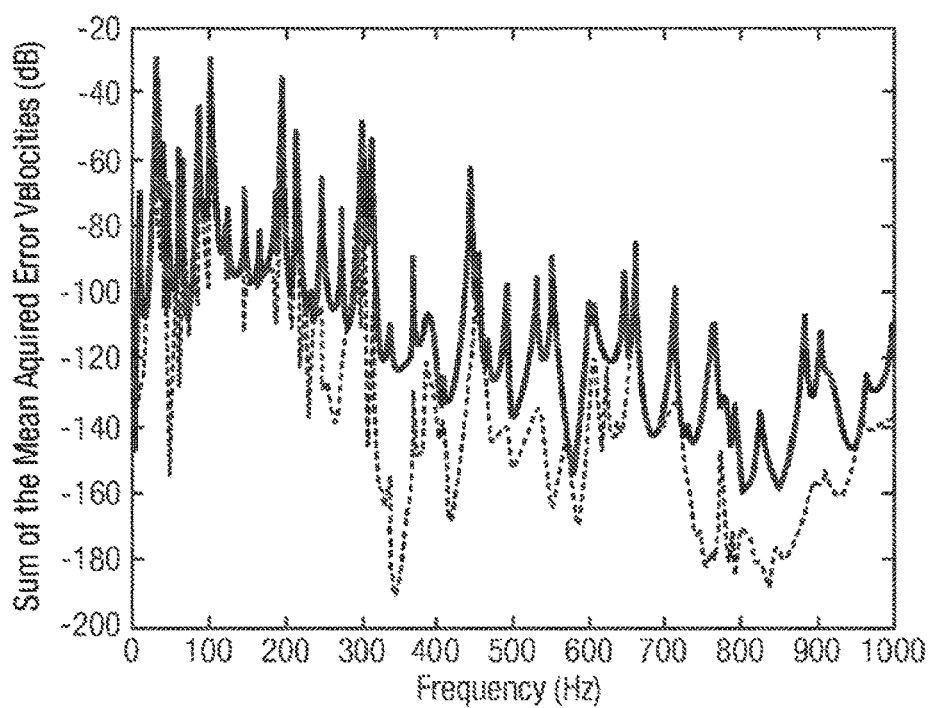
FIG. 7B is a plot, against frequency in Hertz, of the sum of the mean squared value of the velocities in the z-direction measured by the error sensors before control (solid line) and after control (dashed line), in a simulation employing transfer functions measured on the apparatus of FIGS. 1A and 2, and in which three actuators apply a common vertical force and two further actuators apply horizontal forces.

FIGS. 7A and 7B show the modelled sum of the mean squared monitor velocities (FIG. 7A) and error velocities (FIG. 7B) without control (solid line) and when the optimal simulated control is implemented (dashed line). In this example, actuators 70*a-c* were driven with the same signal to minimise the sum of the three mean squared velocities measured by the three error sensors along z-axis. Actuators

70*d, e* were driven with two different signals to minimise the sum of the mean squared velocities in x- and y-axes respectively. In this configuration, the controller 75 applies three orthogonal forces aligned with the principal axes near the point of intersection of the pipe 50 and plate 20 and so is not able to produce moments to control vibration arising from this mode of excitation. Nevertheless, the plots show that significant reduction in excess of 40 dB across a broad range of frequencies can be achieved by implementing this type of control. The resonance of the primary shaker is about 30 Hz, therefore at lower frequencies the structure cannot be efficiently excited. The resonance of the secondary actuators 70 is about 55 Hz therefore control will not be effective at frequencies significantly below this.

Figure 8A:
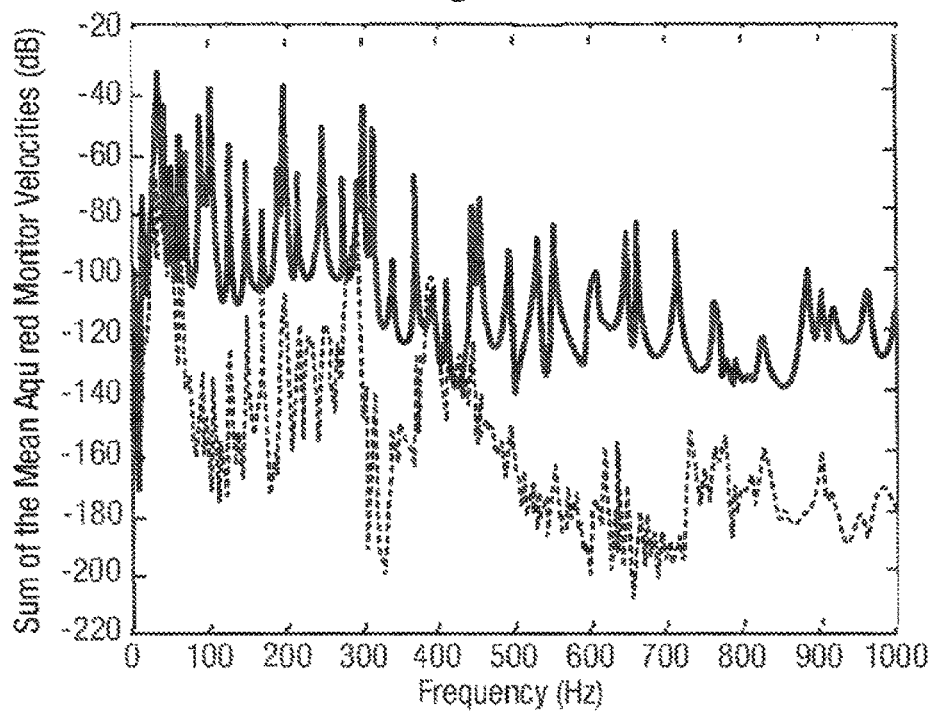
FIG. 8A is a plot, against frequency in Hertz, of the sum of the mean squared velocities in z-direction measured by the monitor sensors before control (solid line) and after control (dashed line), in a simulation identical to that used to generate FIGS. 7A and 7B, but in which three actuators apply three independent vertical forces and two further actuators apply horizontal forces.
Figure 8B:
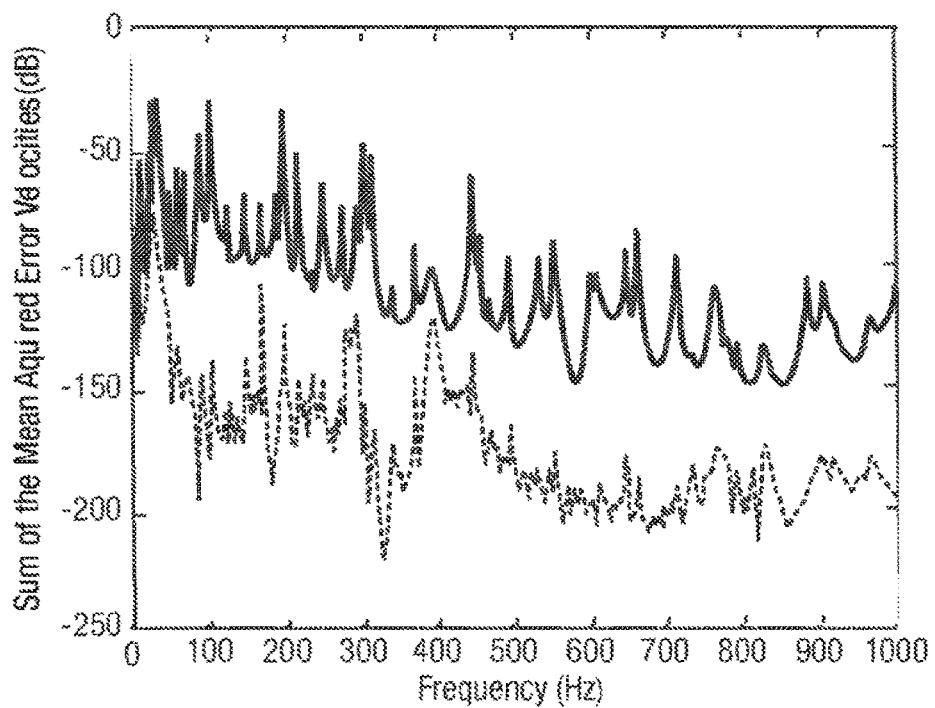
FIG. 8B is a plot, against frequency in Hertz, of the sum of the mean squared velocities in z-direction measured by the error sensors before control (solid line) and after control (dashed line), in a simulation identical to that used to generate FIGS. 7A and 7B, but in which three actuators apply three independent vertical forces and two further actuators apply horizontal forces.

A much better broadband reduction can be achieved when the five secondary actuators 70*a-e* are driven independently to minimise the sum of the mean squared velocities measured by the three error sensors. For this case the controller 75 is able to produce three orthogonal forces and two moments. FIGS. 8A and 8B show the modelled sum of the mean squared monitor velocities (FIG. 8A) and error velocities (FIG. 8B) without control (solid line) and when the optimal simulated control is implemented (dashed line).

A comparison between FIGS. 7A and 7B, and FIGS. 8A and 8B, clearly shows that the most efficient control strategy is that used to produce the latter plot, i.e. one able to generate moments and forces as already predicted by the simulation results from the beam-plate model. It will be noted that the results indicate that a mean reduction in the region of 50 dB is achievable across a very broad band of frequencies. For some specific frequencies however, notably around 390 Hz, the reduction is not as great. However, that this is not significant since that frequency corresponds to a structural mode that is not strongly excited by the pipe excitation and could be tackled with a different distribution of error sensors.

Finally, some preliminary experimental results that demonstrate the performance and potential of the control system are presented. In this experimental work, a controller 75 with only three degrees of freedom was used, i.e. where the three secondary actuators 70 *a-c* on the front face of the annulus 80 were each driven using the same signal to minimise the sum of the mean squared accelerations measured by the corresponding three error sensors in the z direction and the actuators 70*d, e* on the side of the annulus 80 were driven with two different signals to minimise the sum of the mean squared accelerations along the x- and y-axes respectively. This limited structure was used due to programme time constraints and the immediate availability of suitable control software. The harmonic controller 75 was implemented in feedback mode and the disturbance path is therefore assumed to be unknown. The primary disturbance shaker 30 was driven with a sinusoidal signal of 447 Hz and oriented to form an angle of 45 degrees with the three principal axes.

Figure 9A:
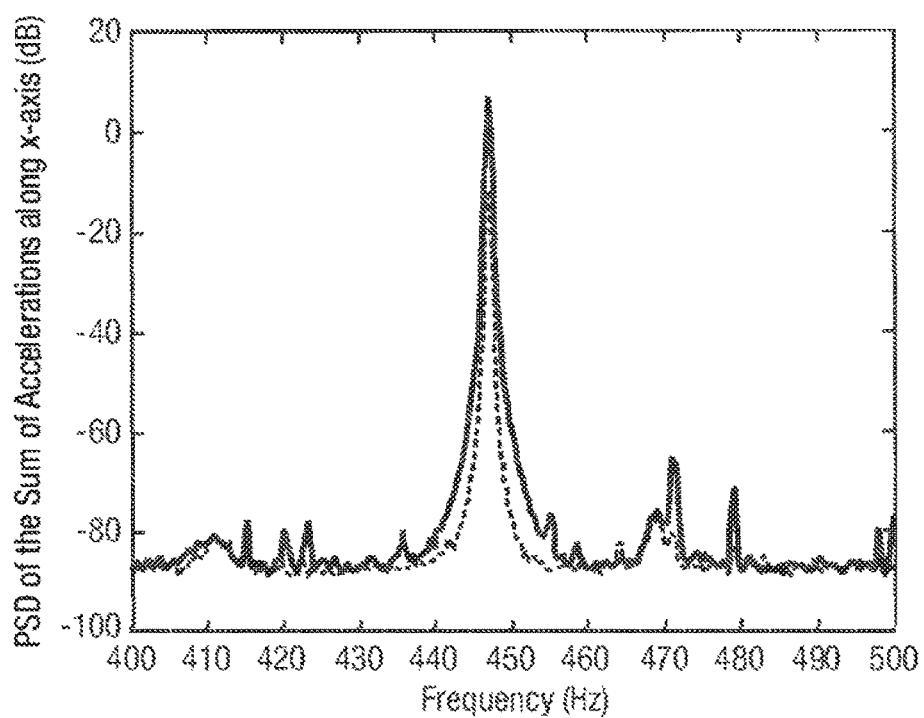
FIG. 9A is a plot of the power spectral density (PSD) of the sum of the accelerations measured by the three error sensors without control (predominantly upper line) and with control (predominantly lower line), along the x-axis, obtained by experiment with the apparatus of FIGS. 1A, 1B and 2 being driven at 447 Hz.
Figure 9B:
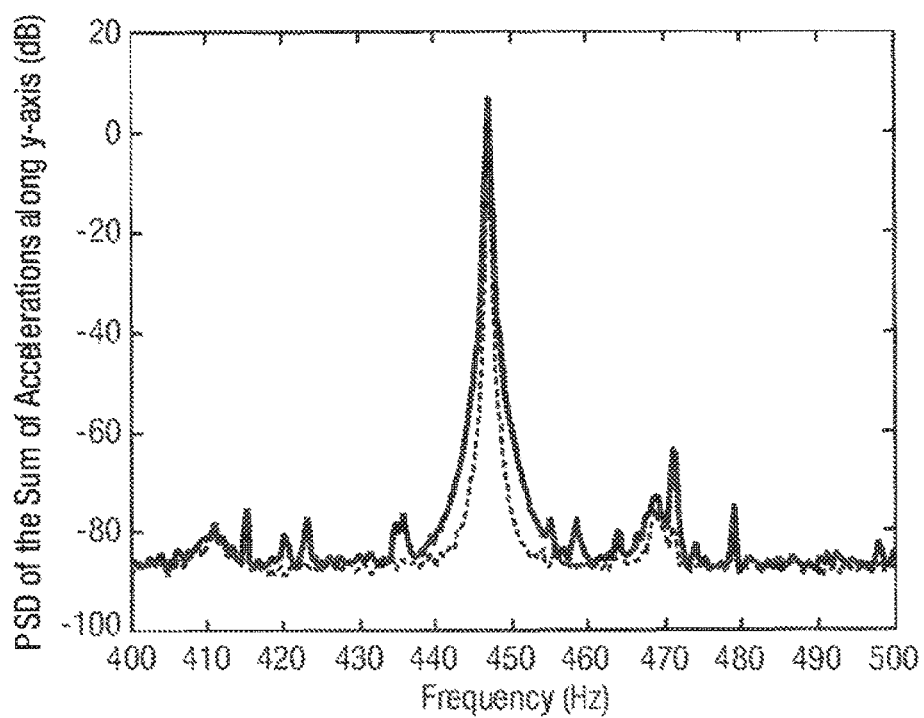
FIG. 9B is a plot of the power spectral density (PSD) of the sum of the accelerations measured by the three error sensors without control (predominantly upper line) and with control (predominantly lower line), along the y-axis, obtained by experiment with the apparatus of FIGS. 1A, 1B and 2 being driven at 447 Hz.
Figure 9C:
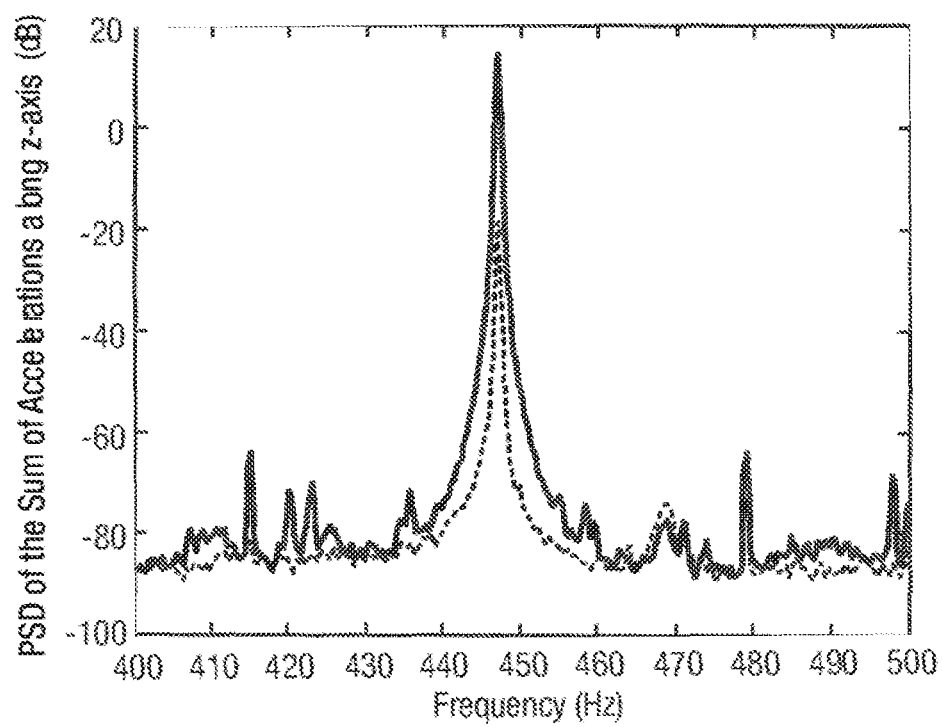
FIG. 9C is a plot of the power spectral density (PSD) of the sum of the accelerations measured by the three error sensors without control (predominantly upper line) and with control (predominantly lower line), along the z-axis, obtained by experiment with the apparatus of FIGS. 1A, 1B and 2 being driven at 447 Hz.

FIGS. 9A, 9B and 9C show the PSD of the sum of the accelerations measured by the three error sensors along x, y and z-axis respectively without control (blue line) and with control (red line). An iterative frequency domain algorithm was used for the control strategy; however, in the time available a rigorous search for the optimal parameters was not possible and so these results do not represent the true optimum performance for this configuration. Nevertheless, and despite the limited control authority, the plots show that the error signals at the excitation frequency of 447 Hz are reduced by 17.3, 17.2 and 32.5 dB respectively. That clearly demonstrates the validity of the theoretical results above and underlines the enormous potential of the approach.

Thus we have shown that an active approach can be used to reduce the levels of plate vibration caused by the solid penetration of a vibrating pipe by several orders of magnitude. The best achievable performance of those investigated here was shown to be obtained by applying controlled forces and moments to the pipe using an actuation system with five degrees of freedom. In simulation work based on a rigorous mobility analysis a mean suppression in the region of 50 dB was shown to be theoretically achievable for a generic interacting plate-pipe system. An actuated pipe collar having the necessary five degrees of freedom was developed and a prototype system was built and trialled using a purpose built laboratory scale test rig. This system was tested under constrained operation, but despite that achieved reductions in an acoustically radiating structural mode of over 30 dB. Use of a collar carrying the actuators has the particular benefit that a high level of vibration suppression can potentially be achieved for all transmission paths that propagate from a given isolation system (e.g. across flexible couplings associated with exhaust, cooling, fuel and power supply systems), and not merely those propagating through the system's mounting.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in to some embodiments of the invention, may be absent in other embodiments.

What is claimed is:
1. An apparatus comprising:
    a machine;
    a plate; and
    at least one of: a cable, a bundle of cables, a pipe for carrying a fluid to or from the machine, and a conduit;
    wherein the machine is on a first side of the plate and at least part of the cable, bundle, pipe or conduit is on a second, opposite, side of the plate; and
    wherein the plate is susceptible to vibrations arising from operation of the machine;
    the apparatus further comprising:
    an active vibration suppressor mounted on the cable, the bundle of cables, the pipe, or the conduit;
    a controller configured to control the active vibration suppressor to reduce vibrations of the plate; and
    a plurality of sensors mounted on the plate, the sensors being arranged to sense vibrations of the plate and to generate a signal indicative of those vibrations.
2. The apparatus as claimed in claim 1, wherein the cable, the bundle of cables, the pipe, or the conduit passes through the plate, from the first side of the plate to the second side of the plate.

3. The apparatus as claimed in claim 1, wherein the cable, the bundle of cables, the pipe, or the conduit is connected to the machine.

4. The apparatus as claimed in claim 1, wherein the plate is or is part of a housing containing the machine.

5. The apparatus as claimed in claim 1, wherein the plate is part of the machine itself, or is directly connected to the machine.

6. The apparatus as claimed in claim 1, wherein the active vibration suppressor is mounted on a part of the cable on the second side of the plate, a part of the bundle of cables on the second side of the plate, a part of the pipe on the second side of the plate, or a part of the conduit on the second side of the plate.

7. The apparatus as claimed in claim 1, wherein the active vibration suppressor comprises a plurality of actuators arranged to act on the cable, the bundle of cables, the pipe, or the conduit.

8. The apparatus as claimed in claim 1, wherein the active vibration suppressor includes a collar that is connected to and at least partially surrounds a circumference of the cable, the bundle of cables, the pipe, or the conduit.

9. The apparatus as claimed in claim 8, wherein three or more actuators are arranged to act in a direction parallel to a length of the cable, a length of the bundle of cables, a length of the pipe, or a length of the conduit by acting on a first surface of the collar, the first surface of the collar being perpendicular to the length of the cable, the length of the bundle of cables, the length of the pipe, or the length of the conduit, and two or more further actuators arranged to act in two directions, orthogonal to the length of the cable, the length of the bundle of cables, the length of the pipe, or the length of the conduit and each other, by acting on the collar on a surface perpendicular to the first surface of the collar.

10. The apparatus as claimed in claim 1, wherein the controller is configured to suppress vibrations of the plate by reducing the value of a parameter derived from the signal from the sensors.

11. The apparatus as claimed in claim 10, wherein the parameter is the sum of mean squared velocities measured by the sensors.

12. A method of suppressing vibrations arising from operation of a machine, wherein the machine is part of an apparatus also including a plate and at least one of: a cable, a bundle of cables, a pipe for carrying a fluid to or from the machine, and a conduit, the machine being on a first side of the plate and at least part of the cable, the bundle of cables, the pipe, or the conduit being on a second, opposite side of the plate, the plate being susceptible to vibrations arising from operation of the machine, the method comprising:
   sensing vibrations of the plate using a plurality of sensors mounted on the plate; and
   applying an actively controlled force to the cable, the bundle of cables, the pipe, or the conduit using an active vibration suppressor configured to be mounted on the cable, the bundle of cables, the pipe, or the conduit to reduce vibrations of the plate.

13. Vibration suppression equipment suitable for use in reducing vibrations in an apparatus comprising a machine, a plate, and a cable, a bundle of cables, a pipe or a conduit, the equipment comprising:
   an active vibration suppressor configured to be mounted on the cable, the bundle of cables, the pipe, or the conduit;
   a plurality of sensors configured to be mounted on the plate, the sensors being arranged to sense vibrations of the plate and to generate a signal indicative of those vibrations; and
   a controller configured to control the active vibration suppressor to reduce vibrations of the plate.

14. The vibration suppression equipment of claim 13, wherein:
   the cable, the bundle of cables, the pipe, or the conduit is connected to the machine and passes through the plate, from a first side of the plate to a second side of the plate;
   wherein the plate is part of the machine itself, or is directly connected to the machine.

15. The vibration suppression equipment of claim 13, wherein the active vibration suppressor comprises a plurality of actuators arranged to act on the cable, the bundle of cables, the pipe, or the conduit.

16. The vibration suppression equipment of claim 13, wherein the active vibration suppressor includes a collar configured to be connected to and at least partially surround a circumference of the cable, the bundle of cables, the pipe, or the conduit.

17. The vibration suppression equipment of claim 16, wherein three or more actuators are arranged to act in a direction parallel to a length of the cable, a length of the bundle of cables, a length of the pipe, or a length of the conduit by acting on a first surface of the collar, the first surface of the collar being perpendicular to the length of the cable, the length of the bundle of cables, the length of the pipe, or the length of the conduit, and two or more further actuators arranged to act in two directions, orthogonal to the length of the cable, the length of the bundle of cables, the length of the pipe, or the length of the conduit and each other, by acting on the collar on a surface perpendicular to the first surface of the collar.

18. The vibration suppression equipment of claim 13, wherein the controller is configured to suppress vibrations of the plate by reducing the value of a parameter derived from the signal from the sensors, and wherein the parameter is the sum of mean squared velocities measured by the sensors.

* * * * *